(12) United States Patent
Mezzino et al.

(10) Patent No.: US 11,680,575 B2
(45) Date of Patent: Jun. 20, 2023

(54) BLEED VALVE

(71) Applicant: Microtecnica S.r.l., Turin (IT)

(72) Inventors: Giacomo Mezzino, Turin (IT);
Gianfranco Salvatoriello, Turin (IT)

(73) Assignee: MICROTECNICA S.R.L., Turin (IT)

(*) Notice: Subject to any disclaimer, the term of this patent is extended or adjusted under 35 U.S.C. 154(b) by 467 days.

(21) Appl. No.: 16/711,534

(22) Filed: Dec. 12, 2019

(65) Prior Publication Data

US 2020/0370560 A1 Nov. 26, 2020

(30) Foreign Application Priority Data

Apr. 17, 2019 (EP) .................................... 19169967

(51) Int. Cl.
*F02C 9/18* (2006.01)
*F04D 27/02* (2006.01)
*F02C 6/08* (2006.01)

(52) U.S. Cl.
CPC ............ *F04D 27/0215* (2013.01); *F02C 6/08* (2013.01); *F02C 9/18* (2013.01); *F04D 27/023* (2013.01); *F05D 2220/32* (2013.01)

(58) Field of Classification Search
CPC ...... F02C 9/18; F02C 6/08; F02C 7/18; F04D 27/0215; F04D 27/0207; F04D 27/0223; F04D 27/023; F04D 27/009
See application file for complete search history.

(56) References Cited

U.S. PATENT DOCUMENTS

| | | | |
|---|---|---|---|
| 3,865,128 A | 2/1975 | Zadoo | |
| 4,251,985 A * | 2/1981 | Sullivan | F02C 9/18 415/27 |
| 6,981,842 B2 | 1/2006 | D'Angelo et al. | |
| 7,555,905 B2 | 7/2009 | Borcea | |
| 2012/0216545 A1* | 8/2012 | Sennoun | B64D 13/06 60/772 |
| 2020/0095944 A1* | 3/2020 | Goodman | F01D 17/105 |

FOREIGN PATENT DOCUMENTS

| | | |
|---|---|---|
| EP | 3056739 A1 | 8/2016 |
| EP | 3112690 A1 | 1/2017 |
| EP | 3626942 A1 | 3/2020 |
| GB | 2376515 A | 12/2002 |

OTHER PUBLICATIONS

European Search Report for European Application No. 19169967.7, International Filing Date Apr. 17, 2018, dated Oct. 9, 2019, 8 pages.
EPO Official Letter for Application No. 19169967.7, dated Jan. 26, 2022, 7 pages.

* cited by examiner

*Primary Examiner* — Katheryn A Malatek
(74) *Attorney, Agent, or Firm* — Cantor Colburn LLP

(57) ABSTRACT

An apparatus for use in a gas turbine engine is disclosed comprising a bleed valve and an intermediate valve. In use the bleed valve is exposed to a source of pressurised air, and the bleed valve is movable between an open position, in which the bleed valve permits a flow of the pressurised air through the bleed valve and a closed position, in which the bleed valve does not permit a flow of the pressurised air through the bleed valve. The intermediate valve is operatively connected to the bleed valve and configured to selectively open and close the bleed valve, wherein the intermediate valve is configured in a mode of operation to close the bleed valve based on the pressurised air within the bleed valve exceeding a predetermined threshold.

15 Claims, 7 Drawing Sheets

BLEED VALVE

FOREIGN PRIORITY

This application claims priority to European Patent Application No. 19169967.7 filed Apr. 17, 2019, the entire contents of which is incorporated herein by reference.

FIELD

The present disclosure relates generally to an apparatus comprising a bleed valve, and also an intermediate valve for selectively supplying pressurised air to a component (e.g., a bleed valve).

BACKGROUND

Gas turbine engines are provided with a number of functional sections, including a fan section, a compressor section, a combustion section, and a turbine section. Air and fuel are combusted in the combustion section. The products of the combustion move downstream, and pass over a series of turbine rotors, driving the rotors to provide power. The turbines drive the compressor and fan rotors.

At start-up, the turbine section of the gas turbine engine has not begun to fully provide power. Thus, driving the compressor, as an example, is more challenging than it will be at steady state conditions. It is known in prior art gas turbine engines to include a bleed valve to bleed air away from the compressor section during start-up and reduce the load to drive the compressor. Known bleed valves utilise some form of electric, pneumatic or hydraulic actuator to drive a valve between open and closed positions. The valve is powered open at start-up and powered to a closed position after start-up has been completed.

A conventional bleed valve 10 is shown in FIG. 1, which includes a spring 14 configured to bias a piston 12 towards an open position, as shown in FIG. 1. A solenoid 16 forms part of a pneumatic switch 18 that can be switched from a first position (as shown in FIG. 1) to a second position. The valve 10 comprises a plug 20 configured to mate with a portion of a gas turbine engine (e.g., part of a compressor section), such that the pressure experienced within the body of the plug 20, shown as cavity 22, corresponds to that of the portion of the gas turbine engine with which it is mated. This is typically a relatively low pressure section of the compressor, or a low pressure compressor (where the engine comprises a low pressure compressor and a high pressure compressor). The valve 10 comprises an outlet 24 located, for example, at an end of the valve 10 opposite the plug 20, wherein the outlet 24 is configured for discharging airflow to an environment (e.g., ambient).

During engine start-up the solenoid 16 is not energised. As such, the pneumatic switch 18 occupies its first position. From FIG. 1 it can be seen that a chamber 13 is defined between the piston 12 and an inner housing 11 of the valve 10, which is suitably sealed such that air pressure within this chamber 13 causes a force to act on the piston 12 in a direction against the action of the spring 14. Based on the activation of the solenoid 16, the first valve 18 moves between its two positions to fluidly connect the chamber 13 to a relatively high pressure section of the engine, for example a relatively high pressure section or stage of the compressor, or a high pressure compressor (where the engine comprises a low pressure compressor and a high pressure compressor). During engine start-up, the first valve 18 occupies its first position such that chamber 13 is exposed to air at a relatively low pressure, such that the spring force provided by the spring 14 overcomes the force from the pressure applied to the piston 12, and the piston 12 remains in its open position as shown in FIG. 1.

Once it is desired to close the bleed valve 10, the solenoid 16 can be energised, which moves the pneumatic valve 18 to its second position, as shown in FIG. 2. In this position relatively high pressure air will be supplied to the chamber 13, which increases the air pressure on the piston 12, and also the force acting against the action of the spring 14. As such, the piston 12 will be moved to its closed position (FIG. 2). This means that once the engine start-up has completed, and there is no longer a need to bleed air, e.g., away from the compressor section, the valve 10 will close.

It is desired to improve the ability of a bleed valve (such as that shown in FIG. 1) to respond to an increase in operating pressure upon failure of the means to close it (e.g., a solenoid).

SUMMARY

In one aspect that may be claimed independently, the disclosure provides an apparatus (e.g., for use in a gas turbine engine), comprising: a bleed valve, wherein in use the bleed valve is exposed to a first source of pressurised air, and the bleed valve is movable between an open position, in which the bleed valve permits a flow of air from the first source of pressurised air through the bleed valve and a closed position, in which the bleed valve does not permit a flow of air from the first source of pressurised air through the bleed valve. The apparatus also includes an intermediate valve operatively connected to the bleed valve and configured to selectively open and close the bleed valve, wherein the intermediate valve is configured in a mode of operation to close the bleed valve based on the air from the first source of pressurised air reaching and/or exceeding a predetermined threshold.

The above arrangement means that the responsibility of opening and closing the bleed valve is controlled by the intermediate valve, rather than, e.g., the bleed valve itself. In addition, the bleed valve may be designed to release air from an environment (i.e., the first source of pressurised air) and the intermediate valve responds to this air reaching and/or exceeding a predetermined threshold.

The bleed valve may be located on a gas turbine engine component (e.g., a compressor), but would be suitable to use in any situation that requires a bleed valve. In various embodiments the first source of pressurised air may be compressed air, e.g., from a relatively low pressure section of the gas turbine engine (e.g., a relatively low pressure section or stage of the compressor, or a low pressure compressor).

The bleed valve may comprise a movable abutment that moves between first and second positions, wherein in the first position the bleed valve is in its open position, and in its second position the bleed valve is in its closed position. The movable abutment may be a piston.

The bleed valve may further comprise a first resilient member (e.g., a first spring) configured to urge the movable abutment to its first position in which the bleed valve is open.

The bleed valve may further comprise a chamber configured to receive pressurised air, wherein the movement of the bleed valve between its open and closed positions may be controlled by the pressure of air within the chamber. For example, an increase in air pressure within the chamber may cause movement of the bleed valve from its open position to its closed position.

In various embodiments the chamber may be defined at least in part by the movable abutment, wherein an increase in air pressure within the chamber in use causes the movable abutment to move from its first position to its second position against the action of the first resilient member.

The apparatus may further comprise a second source of pressurised air. The second source of pressurised air may generally be air at a relatively high pressure (e.g., relative to the first source of pressurised air), for example air from a relatively high pressure section of the gas turbine engine (e.g., a relatively high pressure section or stage of the compressor, or a high pressure compressor).

The apparatus may comprise a first valve configured to selectively supply the second source of pressurised air to the intermediate valve, e.g., via an output of the first valve. The first valve may comprise a solenoid or other actuator configured to selectively supply the second source of pressurised air to the intermediate valve.

The intermediate valve may be movable between first and second positions. In the first position the intermediate valve may be configured to fluidly connect the second source of pressurised air (e.g., the output of the first valve) to the chamber of the bleed valve, so that an increase in pressure of the second source of pressurised air supplied to the intermediate valve (e.g., via the first valve) causes a corresponding increase in the air pressure within the chamber so as to cause the movable abutment to move from its first position to its second position against the action of the first resilient member.

In the second position the intermediate valve may be configured to fluidly connect the first source of pressurised air (i.e., that the bleed valve is exposed to) with the chamber, so as to cause the movable abutment to move from its first position to its second position against the action of the first resilient member.

The intermediate valve may move between its first and second positions based on the first source of pressurised air reaching and/or exceeding a given or predetermined threshold pressure.

The intermediate valve may comprise a switch (or other apparatus, device or means) configured to move the intermediate valve between its first and second positions, wherein the switch is exposed to the first and second sources of pressurised air and is configured to move the intermediate valve between its first and second positions based on the first source of pressurised air reaching and/or exceeding the given or predetermined threshold pressure.

The intermediate valve may comprise a first inlet fluidly connected to the second source of pressurised air (and, e.g., fluidly connected to the first valve), a second inlet fluidly connected to the first source of pressurised air, and an outlet fluidly connected to the chamber, wherein the switch is configured to selectively fluidly connect the first inlet or the second inlet with the outlet so as to switch between fluidly connecting the chamber with the first source of pressurised air and the second source of pressurised air.

The switch may comprise a member that is movable between first and second positions, wherein in its first position the member is configured to substantially fluidly connect the first inlet and the outlet and substantially fluidly disconnect the second inlet and the outlet, and in its second position the member is configured to substantially fluidly connect the second inlet and the outlet and substantially fluidly disconnect the first inlet and the outlet.

The intermediate valve may further comprise a chamber fluidly connected to the first inlet via a first conduit and to the second inlet via a second conduit, wherein in its first position the member substantially forms a seal with the first conduit to substantially fluidly disconnect the second inlet and the outlet as aforesaid, and in its second position the member substantially forms a seal with the second conduit to substantially fluidly disconnect the first inlet and the outlet as aforesaid.

The switch may comprise a second resilient member (e.g., a second spring) configured to bias the member to its first position. The resilience or spring constant of the second resilient member may be selected based on the given or predetermined threshold pressure. In this manner the resilience or spring constant of the second resilient member may determine the moment at which the bleed valve closes.

The sealing member (or apparatus) may be configured such that in its first position a relatively small portion of the sealing member is exposed to the first source of pressurised air, and in its second position a relatively large portion of the sealing member is exposed to the first source of pressurised air, such that the force exerted on the sealing member by the first source of pressurised air increases (e.g., suddenly) as the sealing member moves between its first and second positions.

For example, the sealing member may form a seal with a rim of the first conduit in its first position, such that movement of the sealing member away from the rim (e.g., towards its second position) exposes a larger portion of the sealing member to the first source of pressurised air.

In an aspect, the disclosure provides a gas turbine engine comprising an apparatus as described above.

The intermediate valve disclosed herein may be suitable for use in any situation that requires a selective supply of pressurised air to a component. Therefore from an aspect, which may be claimed independently, a valve is provided for selectively supplying pressurised air to a component. The valve includes: a chamber; a first inlet for fluidly connecting a first source of pressurised air to the chamber; a second inlet for fluidly connecting a second source of pressurised air to the chamber; and an outlet for fluidly connecting the chamber to a component. The valve also includes: a sealing member (e.g., a ball) movable between first and second positions, wherein in its first position the member is configured to substantially fluidly connect the first inlet and the outlet and substantially fluidly disconnect the second inlet and the outlet, and in its second position the sealing member is configured to substantially fluidly connect the second inlet and the outlet and substantially fluidly disconnect the first inlet and the outlet; and a resilient member (e.g., a spring) configured to bias the sealing member to its first position.

The chamber may be fluidly connected to the first inlet via a first conduit and to the second inlet via a second conduit. In its first position the member may substantially form a seal with the first conduit to substantially fluidly disconnect the second inlet and the outlet as aforesaid. In its second position the member may substantially form a seal with the second conduit to substantially fluidly disconnect the first inlet and the outlet as aforesaid.

BRIEF DESCRIPTION OF THE DRAWINGS

Various embodiments will now be described, by way of example only, and with reference to the accompanying drawings in which.

DETAILED DESCRIPTION

Herewith will be described various embodiments of a bleed valve for use in a gas turbine engine that includes an intermediate pneumatic valve configured to control the air pressure within a chamber of the bleed valve based on an engine operating pressure, so that the spring constant or preload does not need to be precisely defined.

Figure 1:
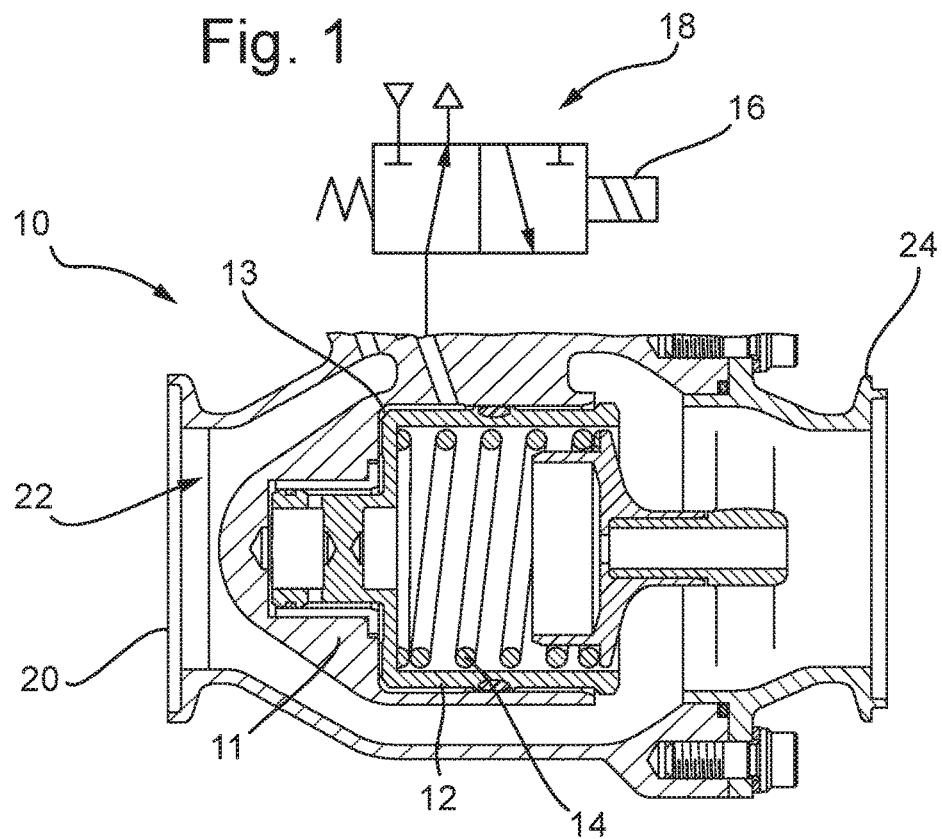
FIG. 1 shows a bleed valve in an open position.
Figure 2:
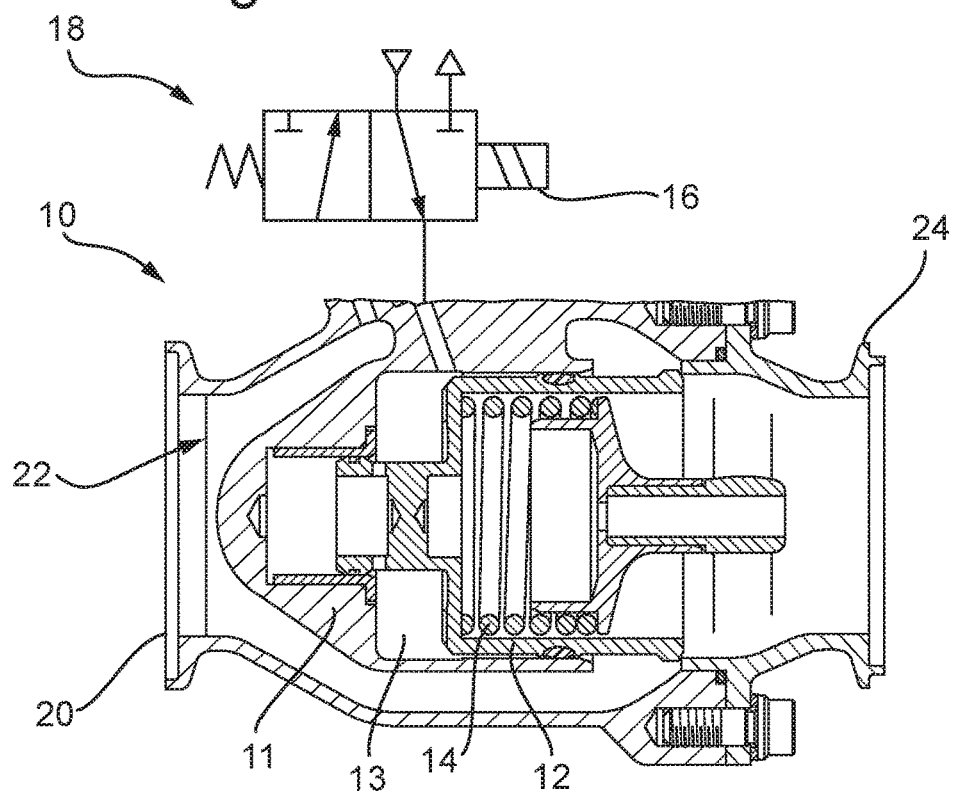
FIG. 2 shows the bleed valve of FIG. 1 in a closed position.
Figure 3:
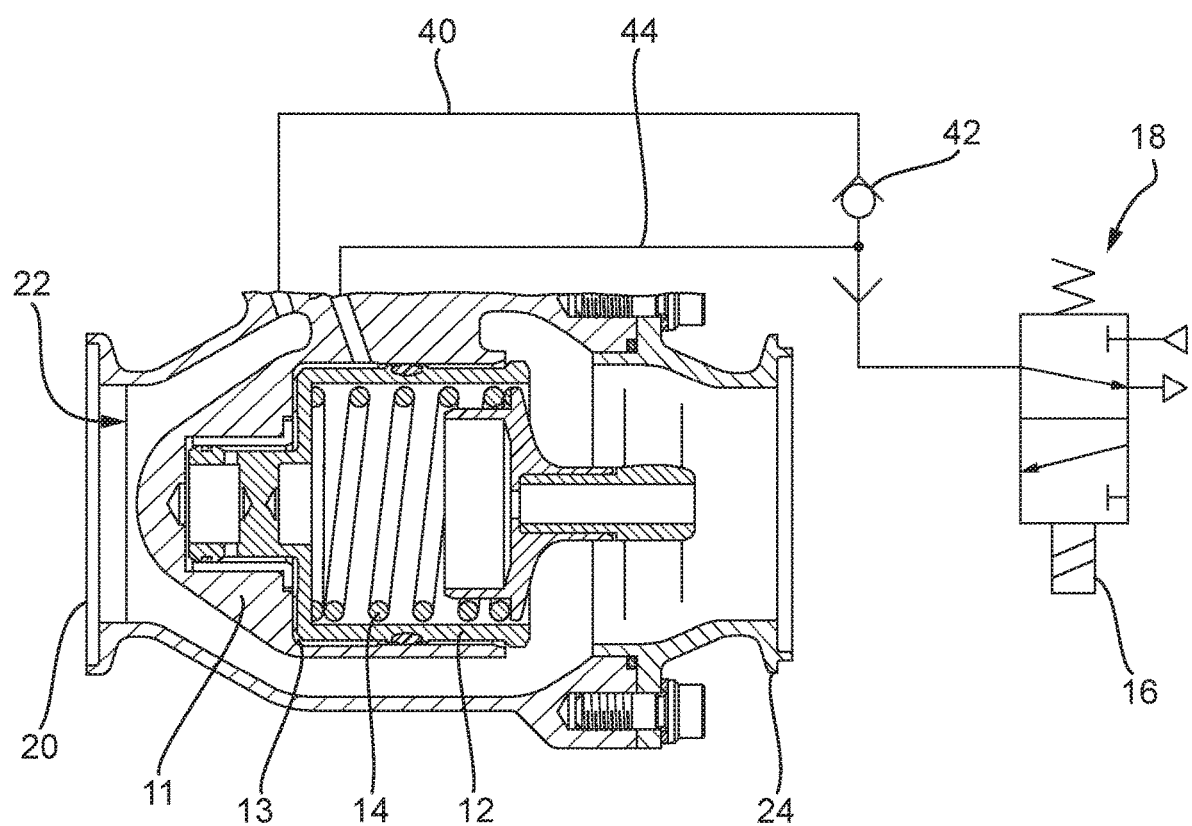
FIG. 3 shows the bleed valve of FIG. 1 with a slight modification.

FIG. 3 shows an apparatus including the valve 10 of FIG. 1, and with a slight modification to account for failure of the pneumatic switch 18, for example electrical failure of the solenoid 16. This apparatus includes a first conduit 40 that fluidly connects the bleed valve interior, e.g., cavity 22, which is at an engine operating pressure, for example exposed to compressed air that may be from a relatively low pressure section of the compressor (or a low pressure compressor). The apparatus further includes a check valve 42, and a second conduit 44 that fluidly connects the check valve 42 with the chamber 13. The second conduit 44 also fluidly connects the pneumatic switch 18 with the chamber 13. The check valve 42 may be configured to permit air to pass therethrough once the air pressure in the first conduit 40 (i.e., at the engine operating pressure) reaches and exceeds a certain value.

In case of failure of the solenoid 16, once the engine operating pressure increases to above a certain value, air at this pressure will be transferred through the check valve 42 to the chamber 13. The spring constant of the spring 14 is set such that air at this pressure is sufficient to increase the force acting against the spring 14 so as to move the piston 12 against the action of the spring 14 and the valve 10 into its closed position. This ensures the valve 10 closes in use if the solenoid fails.

Although the arrangement of FIG. 3 overcomes problems relating to the possible failure of the solenoid 16, it can be difficult to choose a spring constant or preload that accurately corresponds to a specific air pressure that causes movement of the piston 12. For example, friction and piston hysteresis can cause instability issues when working around a desired switching pressure.

Therefore, further improvements in the ability of the bleed valve 10 to close when the engine operating pressure reaches a specific value may be desired.

Figure 4:
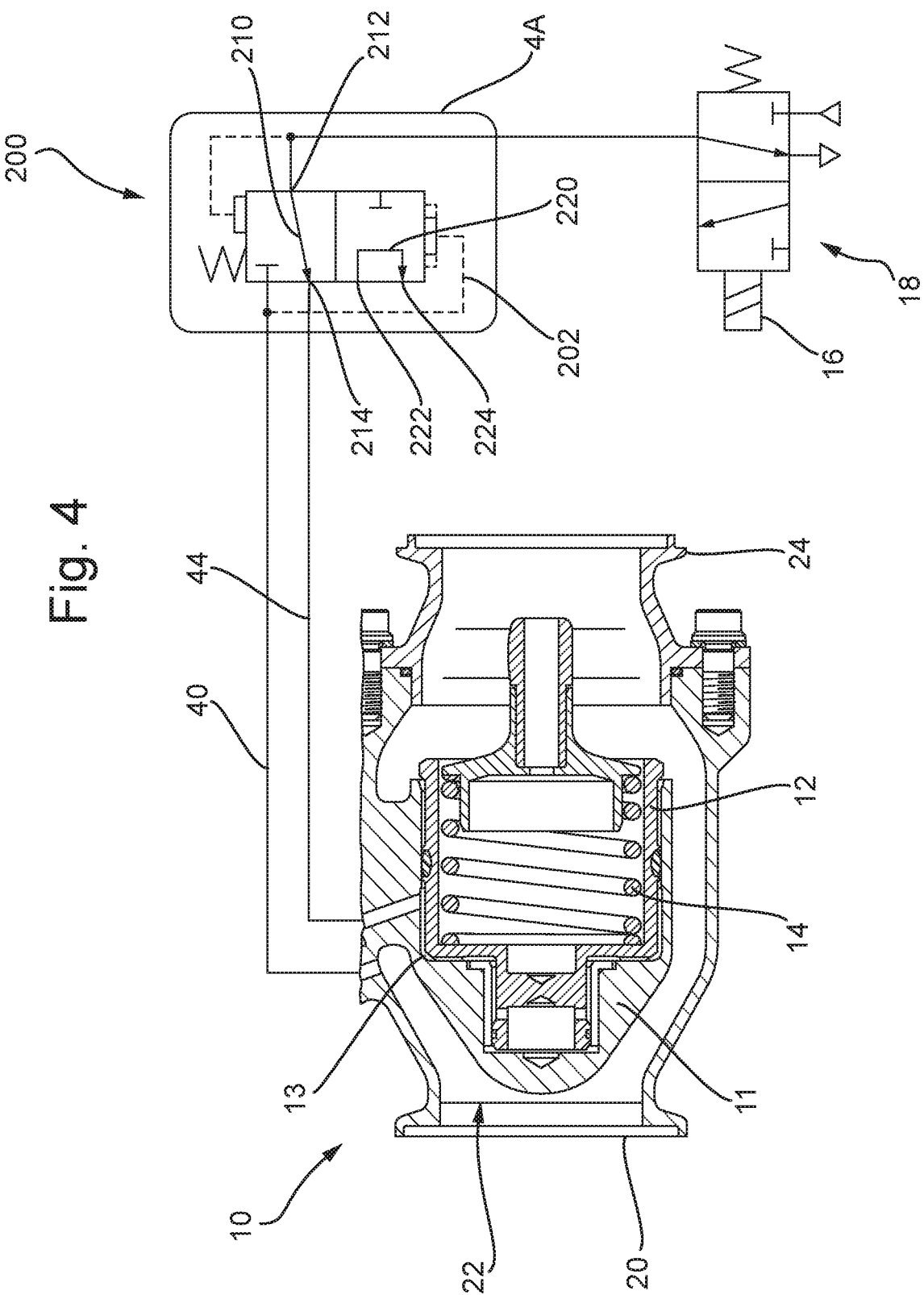
FIG. 4 shows an apparatus according to the present disclosure, including a schematic representation of an intermediate valve for use in the apparatus.

FIG. 4 shows an apparatus 100 comprising a bleed valve 10 in combination with a first pneumatic valve 18, similar to that described above in respect of FIG. 3, as well as a second, intermediate pneumatic valve 200 positioned between the first pneumatic valve 18 and the valve 10. The second hydraulic valve 200 essentially replaces the check valve 42 and is positioned at the junction between the first conduit 40 and the second conduit 44.

The intermediate valve 200 is configured to control the air that is supplied to the chamber 13, and specifically select either air that is at an engine operating pressure from the first conduit 40, for example air from a relatively low pressure section of the engine (e.g., a relatively low pressure section or stage of a compressor, or a low pressure compressor), or select air provided through the first hydraulic valve 18, which may be, for example, from a relatively high pressure section of the engine (e.g., a relatively high pressure section or stage of the compressor, or a high pressure compressor).

FIG. 4 shows schematically the operation of the intermediate valve 200, which is shown as movable between first and second positions. In the first position (as shown in FIG. 4) the intermediate valve 200 is configured to fluidly connect the chamber 13 of the bleed valve 10 with the output of the first valve 18 through a first passage 210, which extends from an inlet 212 to an outlet 214.

During normal operation the solenoid 16 can be activated or deactivated as described above, so as to selectively supply high pressure air to the chamber 13 and move the piston 12 so that the bleed valve 10 moves to its closed position. In this manner the apparatus 100 and bleed valve 10 operate similar to the conventional manner described above.

The intermediate valve 200 is movable to a second position in which air is supplied to the chamber 13 that is at an engine operating pressure (e.g., relatively low pressure air), for example from the interior of the bleed valve 10 via the first conduit 40 and through a second passage 220 of the intermediate valve 200, which extends from an inlet 222 to an outlet 224. The intermediate valve 200 may only move to its second position upon deactivation of the solenoid 16 or where the solenoid 16 is otherwise in a failure mode (e.g., the first valve 18 is vented to ambient). When the intermediate valve 200 is in this position, air will be transferred under the engine operating pressure through the second passage 212 of the intermediate valve 200 to the chamber 13.

The intermediate valve 200 moves between its first and second positions based on the engine operating pressure reaching a predetermined threshold. This is shown schematically in FIG. 4 by the control line 202. Using the intermediate valve 200 to switch at a predetermined threshold of the engine operating pressure means that the responsibility for closing the valve is taken away from the spring 14 (which may be referred to as a resilient member in the broadest aspects and embodiments of the present disclosure). As such, the switching point of the bleed valve 10 is no longer defined by the spring 14, meaning that the problems of friction and piston hysteresis are reduced or eliminated. For example, the spring 14 can be set at a much lower value than it would need to be, e.g., for the arrangement shown in FIG. 3, since air at increased pressure will not be supplied to it unless the intermediate valve 200 has switched.

Figure 4A:
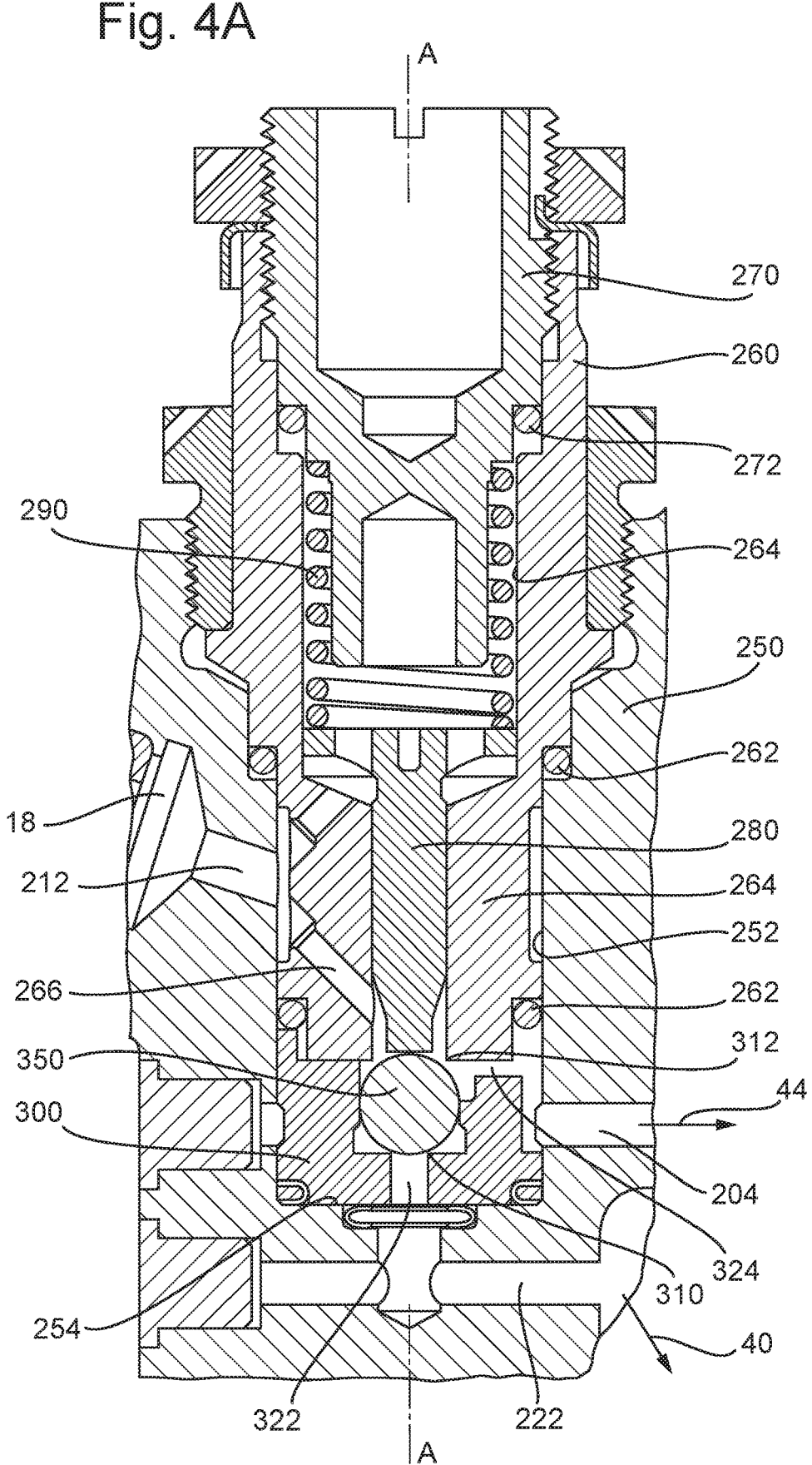
FIG. 4A shows an embodiment of the intermediate valve of FIG. 4.

FIG. 4A shows an embodiment of an intermediate valve 200 that operates in the manner described above. As discussed above the features of the intermediate valve 200 are advantageous in their own right and may be claimed independently of the remainder of the apparatus in various aspects and embodiments.

The intermediate valve 200 comprises a housing 250, a first plug 260 and a second plug 270.

The housing 250 comprises an internal cavity 252, and the first plug 260 is inserted into the internal cavity 252 of the housing 250 and a lower portion 264 of the first plug 260 is sealed against the walls of the internal cavity 252 using one or more seals 262. The first plug 260 is hollow and itself comprises an internal cavity 264 of varying diameter relative to its longitudinal axis A.

The second plug 270 is inserted into the internal cavity 264 of the first plug 260 and a lower portion of the second plug 270 is sealed against the walls of the internal cavity 264 of the first plug 260 using one or more seals 272.

The intermediate valve 200 further comprises a pin 280 that is slidably received within the internal cavity 264 of the second plug 260, and is movable along the axis A so that it occupies various axial positions. A resilient member 290 is positioned within the internal cavity 264 and is biased between the second plug 270 and the pin 280, so that it urges the pin 280 in a direction away from the second plug 270.

The inlet 212 of the first passage 210 is shown in FIG. 4A and leads into the internal cavity 252 of the housing 250, which is occupied in part by the lower portion 264 of the first plug 260. An outlet 204 of the intermediate valve 200 connects to the second conduit 44 and, as will be appreciated, corresponds to the outlets 214, 224 described above in reference to the schematic of FIG. 4.

A body 300 is inserted into the internal cavity 252 of the housing 250 between the lower portion 264 of the first plug 260 and a bottom surface 254 of the internal cavity 252. The body 300 comprises a central chamber 302, wherein a sealing member 350 (e.g., a ball) is held within the central chamber 302 of the body 300, which sealing member 350 is configured to control the flow of air through the intermediate valve 200.

The pin 280 is configured to urge the sealing member 350 against a first rim 310 so that, in normal operation, the sealing member 350 forms a fluid seal against the first rim 310. The intermediate valve 200 is connected to the first conduit 40 via the inlet 222, which inlet 222 is fluidly connected to a first conduit 322 of the body 300 that terminates at the first rim 310. As such, in normal operation, the intermediate valve 200 prevents fluid from passing between the first conduit 40 and the second conduit 44, through the use of the sealing member 350.

The first plug 260 comprises one or more conduits 266 that fluidly connect the inlet 212 of the intermediate valve 200 to the central chamber 302 of the body 300, such that a fluid entering the inlet 212 will pass through the one or more conduits 266 to the central chamber 302.

The central chamber 302 of the body 300 is fluidly connected to the outlet 204 of the intermediate valve 200 (corresponding to the outlets 214, 224 shown schematically in FIG. 4) via a second conduit 324 of the body 300, so that a fluid entering the central chamber 302 will pass to the outlet 204 and the second conduit 44 of the apparatus 100 via the second conduit 324 of the body 300.

As such, if the solenoid 16 is activated then fluid (e.g., air) will enter the intermediate valve at the inlet 212, pass through the one or more conduits 266 of the first plug 260, enter the central chamber 302 of the body 300, and exit the valve 200 via the second conduit 324 of the body 300 and the outlet 204.

As will be discussed in more detail below, where there is a heightened engine operating pressure and upon failure of the solenoid, fluid pressure may build up in the first conduit 40 of the apparatus 100, and also the inlet 222 and first conduit 322 of the body 300. This pressure may act against the sealing member 350 and urge it in the direction against the action of the pin 280 and resilient member 290.

Should the pressure build up to a sufficient amount, the sealing member 350 will move against the action of the pin 280 and resilient member 290 so that it sits against a second rim 312 that is opposite the first rim 310. At this point the sealing member 350 will fluidly seal the central chamber 302 of the body 300 from the inlet 212 and the one or more conduits 266 of the first plug 260. As such, fluid will be prevented from travelling from the first valve 18 to the central chamber 302 and, in turn, to the second conduit 44 of the apparatus 100.

The operation of the intermediate valve 200 will be described in more detail with reference to FIGS. 5, 6 and 7.

Figure 5:
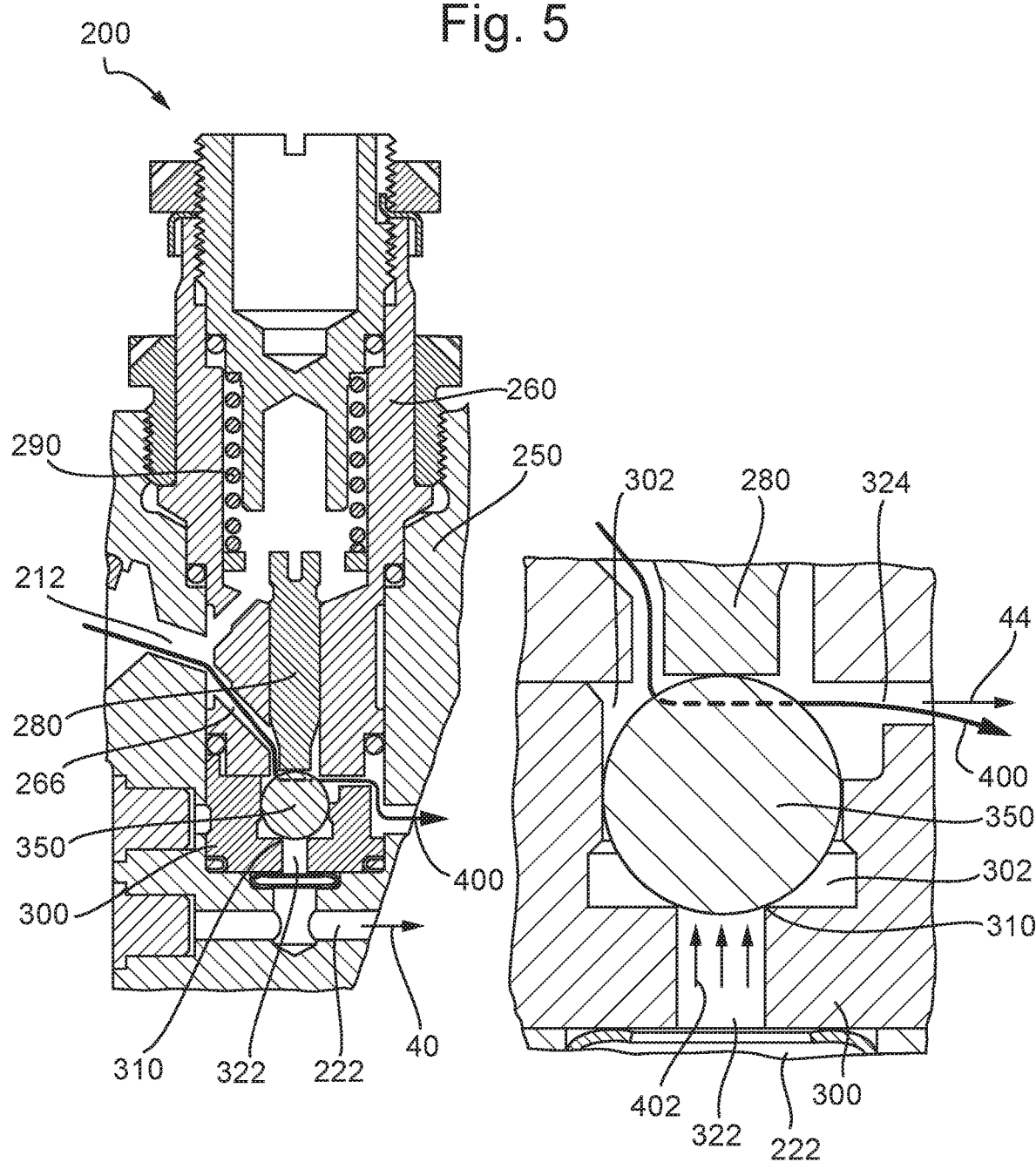
FIG. 5 shows the intermediate valve of FIG. 4A during engine start-up.

FIG. 5 shows the intermediate valve 200 during engine start-up, and/or when the first pneumatic valve 18 is otherwise fluidly connected to the chamber 13 and the solenoid 16 is activated. In this situation the sealing member 350 experiences air pressure on both sides. As discussed above the pressure of the air coming from the solenoid (i.e., via the conduit 266) is greater than the pressure of the air at 402. This means that the resultant force acting on the sealing member 350 is not sufficient to move the sealing member 350 against the action of the pin 280 and resilient member 290. As such, the sealing member 350 forms a seal with the first rim 310, preventing fluid from passing between the inlet 222 and the central chamber 302 of the body 300.

In the situation shown in FIG. 5 the intermediate valve 200 operates in the normal manner, in that the solenoid 16 can be used to supply high pressure air through the intermediate valve 200 as discussed above (see arrow 400 in FIG. 5) so as to increase the air pressure in the chamber 13 and move the piston 12 of the bleed valve 10 to its closed position.

Figure 6:
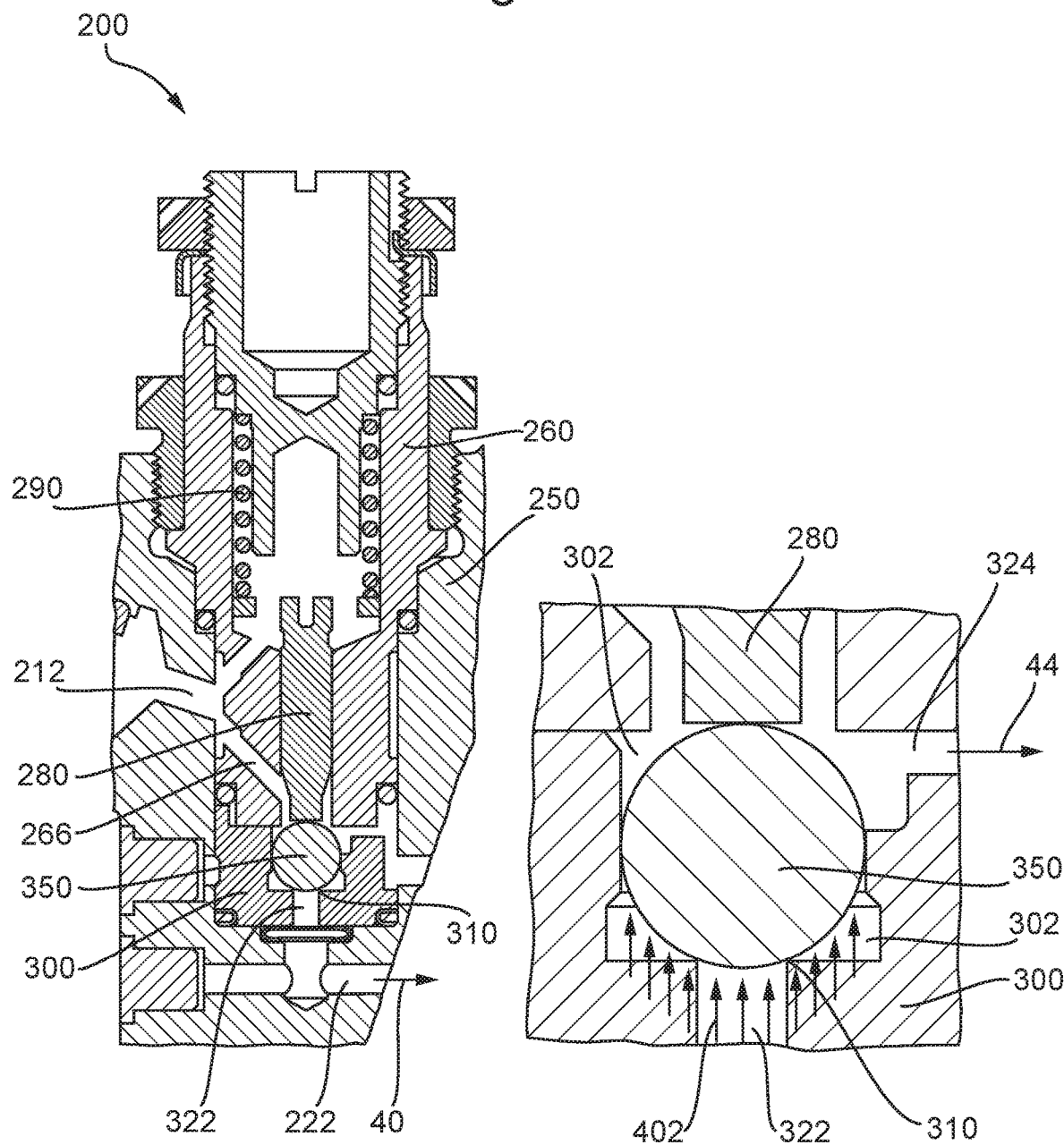
FIG. 6 shows the intermediate valve of FIG. 4A upon the engine operating pressure reaching a threshold pressure.

FIG. 6 shows the intermediate valve 200 upon the engine operating pressure reaching a threshold pressure and with the solenoid 16 deactivated, or the first valve 18 otherwise in a failure mode. In this situation the sealing member 350 begins to move away from the sealing surface 310 and against the action of the pin 280 and resilient member 290, towards the first pin 260.

One feature of the intermediate valve 200 to highlight is the change in the force acting on the sealing member 350 between the position it occupies as shown in FIG. 5, and the position that it occupies as shown in FIG. 6. It will be appreciated that there is a sudden or instantaneous increase in the force acting on the sealing member 350 by the pressure of the air (shown at 402). This is because the sealing member 350 moves away from the first rim 310, which causes air from the first conduit 322 to fill the lower portion of the central chamber 302, and suddenly expose the lower half of the sealing member 350 to air at increased pressure. Because a larger surface area of the sealing member 350 is exposed to air at increased pressure, the force acting on the sealing member 350 by the pressure of the air (shown at 402) suddenly increases.

Figure 7:
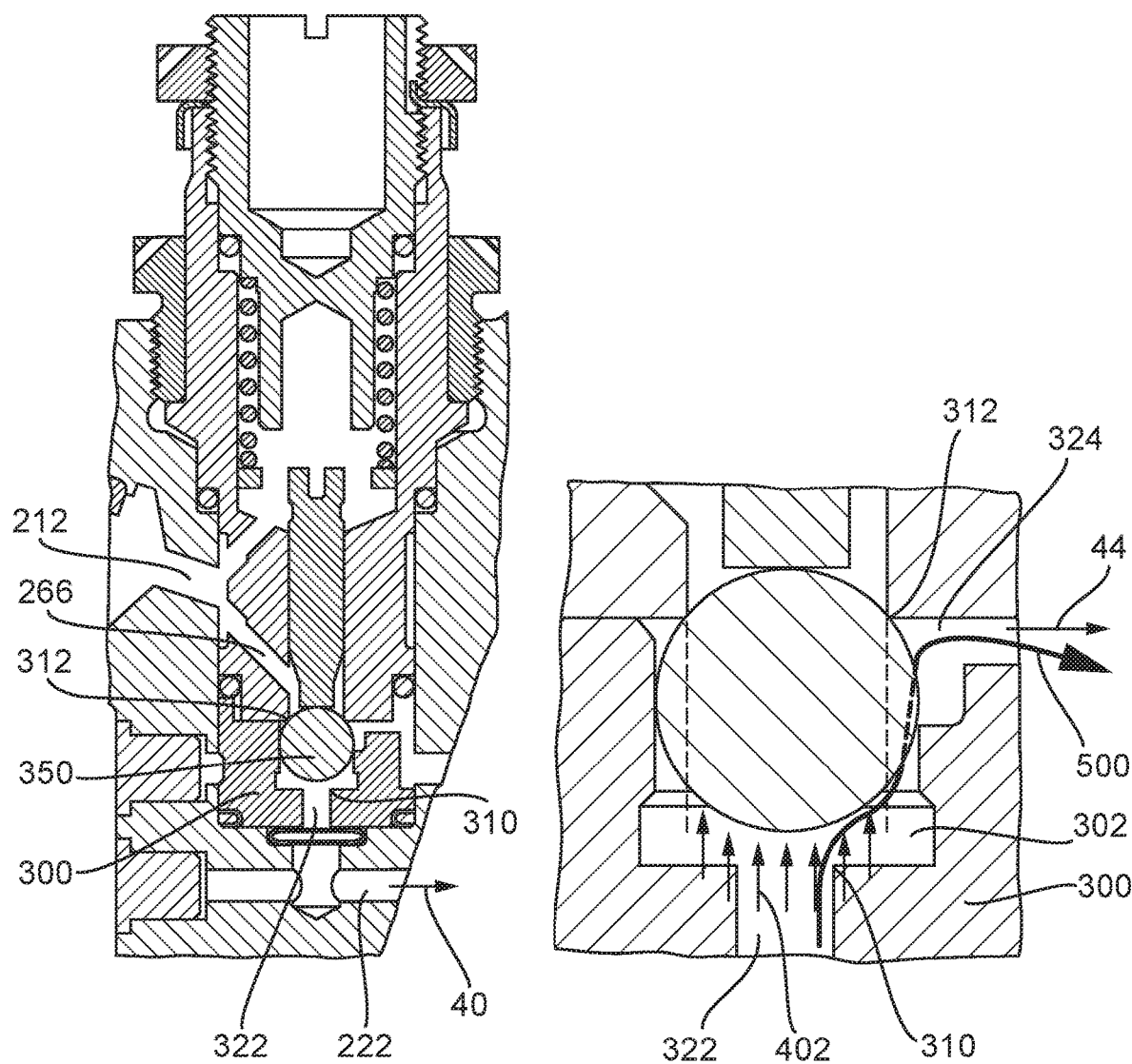
FIG. 7 shows the intermediate valve of FIG. 4A once the engine operating pressure reaches and exceeds the threshold pressure and in the case of a solenoid failure or a de-energised solenoid.

FIG. 7 shows the intermediate valve once the engine operating pressure reaches and exceeds the threshold pressure, and upon failure of the solenoid 16. In this situation, the engine operating pressure is of a sufficient amount that it forces the sealing member 350 towards the first pin 260 to the extent that the sealing member 350 contacts and forms a fluid seal at the second rim 312. As such, this opens up the fluid connection between the first conduit 40 of the apparatus 100 and the second conduit 44 of the apparatus 100, such that high pressure air can be supplied through the intermediate valve 200 as discussed above (see arrow 500 in FIG. 7) so as to increase the air pressure in the chamber 13 and move the piston 12 of the bleed valve 10 to its closed position.

It will be appreciated that using and intermediate valve 200 that operates in the above manner provides a more accurate and reliable switch to close the bleed valve 10 in the event of solenoid failure. For example, the switching point or moment is controlled by the intermediate valve 200 instead of the spring or resilient member 14 of the bleed valve 10. As discussed above, this reduces or eliminates the risk of certain factors (e.g., friction, hysteresis) from affecting the switching point, and allows the spring constant (or resilience) of the spring or resilient member 14 to be set at a value much lower than that of the spring 14 in the conventional arrangement of FIG. 3.

In addition, using a sealing member 350 as shown in the embodiments described in respect of FIGS. 4A, 5, 6 and 7 (and related features) provides a particularly efficient switch or selector that enables the intermediate valve 200 to quickly move between its different valve positions as schematically indicated in FIG. 4.

Although the present disclosure has been described with reference to various embodiments, it will be understood by those skilled in the art that various changes in form and detail may be made without departing from the scope of the invention as set forth in the accompanying claims.

The invention claimed is:

1. An apparatus for use in a gas turbine engine, comprising:
  a bleed valve, wherein in use the bleed valve is exposed to a first source of pressurised air, and the bleed valve is movable between an open position, in which the bleed valve permits a flow of air from the first source of pressurised air through the bleed valve and a closed position, in which the bleed valve does not permit the flow of air from the first source of pressurised air through the bleed valve; and
  an intermediate valve operatively connected to the bleed valve and configured to selectively open and close the bleed valve, wherein the intermediate valve is configured in a mode of operation to close the bleed valve based on the air from the first source of pressurised air exceeding a predetermined threshold; and
  a first valve configured to selectively supply a second source of pressurised air to the intermediate valve via an output of the first valve;
  wherein the intermediate valve comprises a switch configured to move the intermediate valve between first and second positions, wherein the switch is exposed to the first and second sources of pressurised air and is configured to move the intermediate valve between the first and second positions of the intermediate valve based on the first source of pressurised air exceeding the predetermined threshold;
  wherein the intermediate valve comprises a first inlet fluidly connected to the second source of pressurised air, a second inlet fluidly connected to the first source of pressurised air, and an outlet fluidly connected to a chamber, wherein the switch is configured to selectively fluidly connect the first inlet and the second inlet with the outlet, so as to switch between fluidly connecting the chamber with the first source of pressurised air and the second source of pressurised air.

2. The apparatus as claimed in claim 1, wherein the bleed valve comprises a movable abutment that moves between first and second positions, wherein when the moveable abutment is in the first position the bleed valve is open, and when the moveable abutment is in the second position the bleed valve is closed.

3. The apparatus as claimed in claim 2, wherein the bleed valve further comprises a resilient member configured to urge the movable abutment to the first position.

4. The apparatus as claimed in claim 3, wherein the chamber is configured to receive pressurised air from the second source of pressurized air and defined at least in part by the movable abutment, wherein an increase in air pressure within the chamber in use causes the movable abutment to move from the first position to the second position against the action of the resilient member.

5. The apparatus as claimed in claim 1, wherein the switch comprises a sealing member that is movable between first and second sealing member positions, wherein in the first sealing member position the sealing member is configured to substantially fluidly connect the first inlet and the outlet and substantially fluidly disconnect the second inlet and the outlet, and in the second sealing member position the sealing member is configured to substantially fluidly connect the second inlet and the outlet and substantially fluidly disconnect the first inlet and the outlet.

6. The apparatus as claimed in claim 5, wherein the switch comprises a resilient member configured to bias the sealing member to the first sealing member position.

7. The apparatus as claimed in claim 6, wherein the sealing member is configured such that when the sealing member is in the first sealing member position a relatively small portion of the sealing member is exposed to the first source of pressurised air, and when the sealing member is in the second sealing member position a relatively large portion of the sealing member is exposed to the first source of pressurised air, such that the force exerted on the sealing member by the first source of pressurised air increases as the sealing member moves between the first and second sealing member positions.

8. The apparatus as claimed in claim 5, wherein the intermediate valve further comprises a second chamber fluidly connected to the first inlet via a first conduit and to the second inlet via a second conduit, wherein when the sealing member is in the first sealing member position the sealing member substantially forms a seal with the first conduit to substantially fluidly disconnect the second inlet and the outlet, and when the sealing member is in the second sealing member position the sealing member substantially forms a seal with the second conduit to substantially fluidly disconnect the first inlet and the outlet.

9. The apparatus as claimed in claim 8, wherein the switch comprises a resilient member configured to bias the member sealing member to the first position.

10. The apparatus as claimed in claim 9, wherein the sealing member is configured such that when the sealing member is in the first sealing member position a relatively small portion of the sealing member is exposed to the first source of pressurised air, and when the sealing member is in the second sealing member position a relatively large portion of the sealing member is exposed to the first source of pressurised air, such that the force exerted on the sealing member by the first source of pressurised air increases as the sealing member moves between the first and second sealing member positions.

11. The apparatus as claimed in claim 8, wherein the sealing member is configured such that when the sealing member is in the first sealing member position a relatively small portion of the sealing member is exposed to the first source of pressurised air, and when the sealing member is in the second sealing member position a relatively large portion of the sealing member is exposed to the first source of pressurised air, such that the force exerted on the sealing member by the first source of pressurised air increases as the sealing member moves between the first and second sealing member positions.

12. The apparatus as claimed in claim 5, wherein the sealing member is configured such that when the sealing member is in the first sealing member position a relatively small portion of the sealing member is exposed to the first source of pressurised air, and when the sealing member is in the second sealing member position a relatively large portion of the sealing member is exposed to the first source of pressurised air, such that the force exerted on the sealing member by the first source of pressurised air increases as the sealing member moves between the first and second sealing member positions.

13. A gas turbine engine comprising the apparatus as claimed in claim 1.

14. An apparatus for use in a gas turbine engine, comprising:
- a bleed valve, wherein in use the bleed valve is exposed to a first source of pressurised air, and the bleed valve is movable between an open position, in which the bleed valve permits a flow of air from the first source of pressurised air through the bleed valve and a closed position, in which the bleed valve does not permit the flow of air from the first source of pressurised air through the bleed valve; and
- an intermediate valve operatively connected to the bleed valve and configured to selectively open and close the bleed valve, wherein the intermediate valve is configured in a mode of operation to close the bleed valve based on the air from the first source of pressurised air exceeding a predetermined threshold; and wherein the bleed valve comprises:
- a movable abutment that moves between first and second positions, wherein when the moveable abutment is in the first position the bleed valve is open, and when the moveable abutment is in the second position the bleed valve is closed;
- a resilient member configured to urge the movable abutment to the first position;
- a chamber configured to receive pressurised air from either the first source of pressurised air or a second source of pressurize air and defined at least in part by the movable abutment, wherein an increase in pressure within the chamber in use causes the movable abutment to move from the first position to the second position against the action of the resilient member, the apparatus further comprising:
- a first valve configured to selectively supply the second source of pressurised air to the intermediate valve via an output of the first valve;
- wherein the intermediate valve is movable between first and second positions, wherein in the first position the intermediate valve is configured to fluidly connect the output of the first valve to the chamber of the bleed valve, so that an increase in pressure of the second source of pressurised air supplied to the intermediate valve via the first valve causes a corresponding increase in the air pressure within the chamber, so as to cause the movable abutment to move from the first position to the second position against the action of the resilient member;
- wherein in the second position the intermediate valve is configured to fluidly connect the first source of pressurised air with the chamber, so as to cause the movable abutment to move from the first position to the second position against the action of the resilient member.

15. A gas turbine engine comprising the apparatus as claimed in claim 14.

* * * * *